June 25, 1935.  C. FOLTZ  2,006,267
GATE HINGE
Filed May 1, 1934
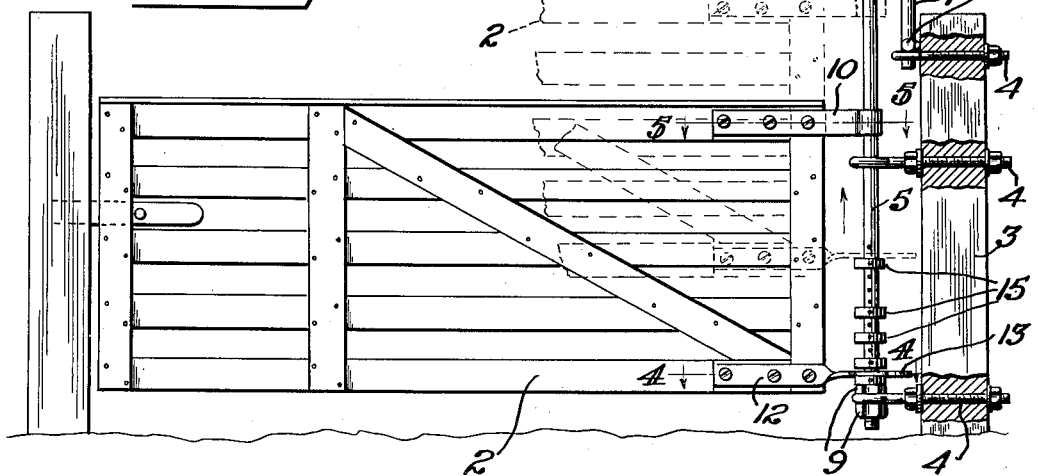
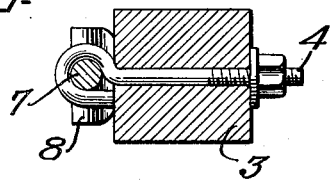
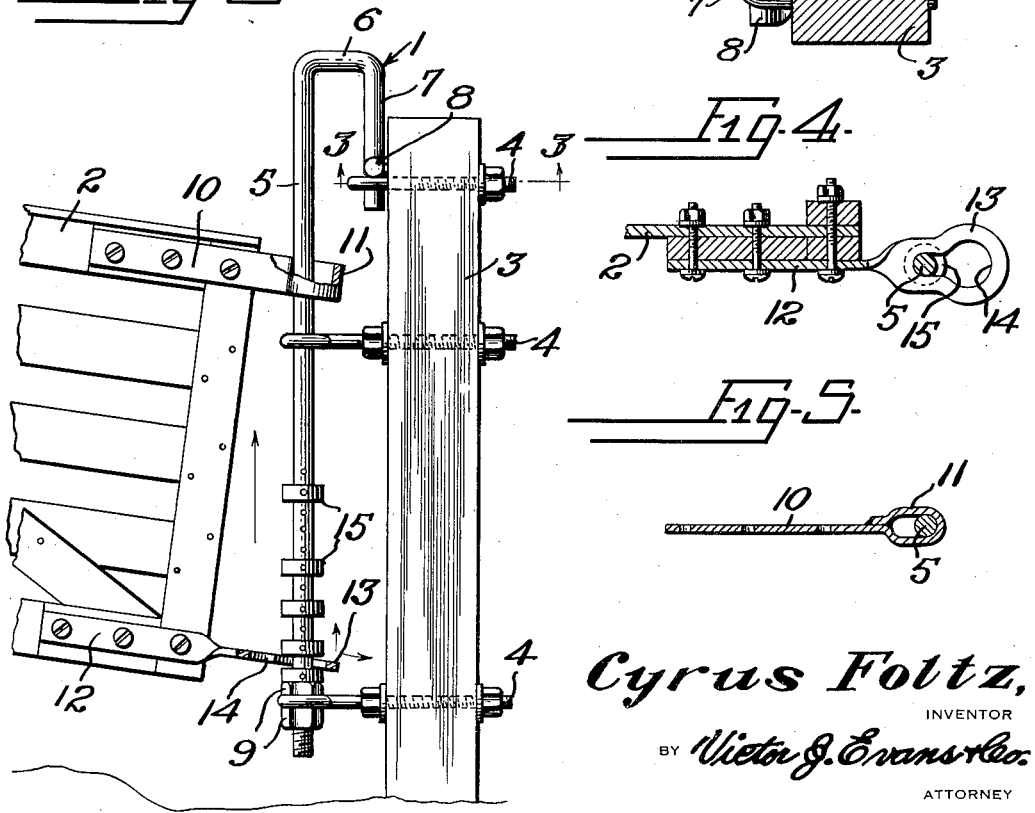
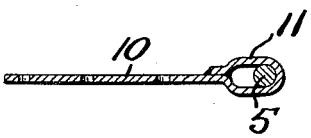
Cyrus Foltz,
INVENTOR
BY Victor J. Evans & Co.
ATTORNEY Patented June 25, 1935

2,006,267

UNITED STATES PATENT OFFICE 2,006,267

GATE HINGE

Cyrus Foltz, Swayzee, Ind.

Application May 1, 1934, Serial No. 723,403

2 Claims. (Cl. 16—132)

This invention relates to a hinge especially adaptable for a gate primarily employed on farms and like places and has for the primary object the provision of a device of the above stated character which will support a gate for free swinging movement and will permit the gate to be easily and quickly raised or lowered with respect to the ground without the use of tools or the rearrangement of the hinge with respect to either the supporting post or the gate.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a gate mounted to a supporting post by a hinge constructed in accordance with my invention.

Figure 2 is a fragmentary side elevation partly in section showing the gate positioned so that it may be adjusted towards or from the ground.

Figure 3 is a sectional view taken on the line 3—3 of Figure 2.

Figure 4 is a sectional view taken on the line 4—4 of Figure 1.

Figure 5 is a detail sectional view illustrating one of the straps or hinge elements of the hinge and taken on the line 5—5 of Figure 1.

Referring in detail to the drawing, the numeral 1 indicates in entirety a hinge especially adapted for mounting a gate 2, to a supporting post 3 so that the gate can be readily swung to open or closed position and also permit of the gate to be adjusted upwardly and downwardly with respect to the ground. The gate being adjustable with respect to the ground has considerable advantage especially when the ground is covered with snow as the gate can be raised so as to clear the snow or when the gate is employed in connection with live stock, the gate can be raised a desired distance from the ground which will form a space which will permit certain size of live stock to pass under the gate while larger live stock will be prevented from passing.

The hinge 1 consists of a series of eye bolts 4 mounted to the post 3 and a pair of said eye bolts have extending therethrough a hinge rod 5, the upper end of which is bent upon itself to form a stop 6 and a shank 7 extending through one of the eye bolts and has formed integrally therewith a projection 8 to abut the post to prevent the hinge rod 5 from turning in the eye bolts. The lower end of the hinge rod 5 has threaded thereto nuts 9 arranged above and below the lowermost eye bolt. A strap member 10 is secured to the upper portion of the gate 2 and has an elongated eye 11 to receive the hinge rod 5. A strap element 12 is secured to the lower portion of the gate 2 and has a head 13 provided with a keyhole slot 14 to receive the hinge rod 5. Adjustably mounted on the hinge rod 5 are spaced collars 15 forming bearings for the strap member 12. The diameter of the collars 15 is such that they may pass through the enlarged portion of the keyhole slot. However, when the rod 5 is located in the restricted portion of the slot 14, the strap member 12 rides upon one of the collars so as to prevent a downward movement of the gate and the latter is prevented from an upward movement by the collar adjacent thereto. Thus it will be seen that the gate may be freely swung to an open or closed position and when it is desired to adjust the gate upwardly or downwardly with respect to the ground the gate is positioned as shown in Figure 2 so that the collars may pass through the keyhole slot 14 of the strap member 12. The gate is raised into the position, as shown in Figure 2, manually while in an open position and when lowered manually, the strap member 12 immediately assumes a position with the hinge rod 5 occupying the restricted portion of the slot 14 so as to ride upon one of the collars 15.

Having described the invention, I claim:

1. A hinge comprising a vertically arranged rod, eye bolts receiving said rod and adapted to be secured to a supporting post, said rod having its upper end bent angularly and downwardly to form a stop and a shank, an eye bolt connecting the shank to the supporting post, a lug on the shank and adapted to abut the post, strap members rotatably and slidably mounted on the rod and adapted to be secured to a gate and capable of moving horizontally for a limited distance with respect to the rod, one of said strap members having a key hole slot to receive the rod, and means adjustably secured to the rod to act as supporting bearings for the last-named strap member and capable of passing through the keyhole slot thereof when the gate is placed in an inclined position with respect to the supporting post.

2. A hinge comprising a vertically arranged rod, eye bolts receiving said rod and adapted to be secured to a supporting post, said rod having its upper end bent angularly and downwardly to form a stop and a shank, an eye bolt connected to the shank and adapted to be secured to the supporting post, a lug on the shank and adapted to abut the post, strap members rotatably and slidably mounted on the rod and adapted to be secured to a gate and capable of moving horizontally for a limited distance with respect to the rod, one of said strap members having a keyhole slot to receive the rod, and a plurality of spaced collars adjustably secured to the rod, each acting as bearing elements for the last-named strap member and capable of passing through the key hole slot when the gate is placed in an inclined position with respect to the supporting post.

CYRUS FOLTZ.